(12) United States Patent
Broyles

(10) Patent No.: US 8,874,572 B1
(45) Date of Patent: Oct. 28, 2014

(54) METHOD AND COMPUTER PROGRAM PRODUCT FOR OPERATING A SOCIAL NETWORKING SITE

(75) Inventor: Eric C. Broyles, Washington, DC (US)

(73) Assignee: Megree, Inc., Washington, DC (US)

( * ) Notice: Subject to any disclaimer, the term of this patent is extended or adjusted under 35 U.S.C. 154(b) by 1587 days.

(21) Appl. No.: 12/219,767

(22) Filed: Jul. 28, 2008

Related U.S. Application Data

(60) Provisional application No. 60/962,666, filed on Jul. 31, 2007.

(51) Int. Cl.
*G06F 17/30* (2006.01)

(52) U.S. Cl.
USPC .............. 707/732; 705/319; 706/45; 709/201

(58) Field of Classification Search
USPC ................... 709/206, 201; 707/732; 705/319; 706/45
See application file for complete search history.

(56) References Cited

U.S. PATENT DOCUMENTS

| | | | |
|---|---|---|---|
| 6,073,138 A | 6/2000 | de l'Etraz et al. | |
| 7,797,345 B1* | 9/2010 | Martino et al. | 707/792 |
| 7,818,392 B1* | 10/2010 | Martino et al. | 709/217 |
| 7,818,394 B1* | 10/2010 | Lawler et al. | 709/217 |
| 7,831,684 B1* | 11/2010 | Lawler et al. | 709/217 |
| 7,844,671 B1* | 11/2010 | Lawler et al. | 709/206 |
| 2007/0124721 A1* | 5/2007 | Cowing et al. | 717/100 |
| 2007/0192863 A1* | 8/2007 | Kapoor et al. | 726/23 |
| 2008/0046516 A1* | 2/2008 | Hyoung et al. | 709/205 |
| 2011/0040844 A1* | 2/2011 | Lawler et al. | 709/206 |

* cited by examiner

*Primary Examiner* — Robert Beausoliel, Jr.
*Assistant Examiner* — Alexandria Bromell
(74) *Attorney, Agent, or Firm* — Pct Law Group, PLLC; Andrew Rush

(57) ABSTRACT

Methods and computer program products for facilitating the operation of Internet-based (i.e., online) social networking sites are disclosed. Such methods and computer program products allow people to discover, explore and maintain relationship paths (i.e., links) with any other person in the world by utilizing the fact that every person has one or more "relationship paths" to everyone else through varying degrees of separation. The power of the Internet, via online social networking sites, is leveraged to build a comprehensive database revealing how each person is connected to everyone by designating certain users of the site as "hubs," "gateways" and/or "connectors."

35 Claims, 3 Drawing Sheets

METHOD AND COMPUTER PROGRAM PRODUCT FOR OPERATING A SOCIAL NETWORKING SITE

CROSS-REFERENCE TO RELATED APPLICATIONS

This Application claims the benefit of, and is related to, Applicant's applications: U.S. patent application Ser. No. 12/219,766 titled, "Relationship Mapping Systems and Methods" filed on Jul. 28, 2008; and U.S. Provisional Patent Application No. 60/962,666 titled "Relationship Mapping Apparatus, Systems, and Methods," filed on Jul. 31, 2007; each of which is incorporated by reference herein in its entirety.

BACKGROUND OF THE INVENTION

1. Field of the Invention

The present invention generally relates to online social networking websites, and more specifically to methods and computer program products for facilitating the operation of such online social networking websites using data provided by individuals accessing such sites world-wide.

2. Related Art

In 1929, a Hungarian author named Frigyes Karinthy published a volume of short stories titled *Everything is Different*. One of these short stories was titled "Chains," or "Chain-Links." The story addressed many of the problems that would captivate future generations of mathematicians, sociologists, and physicists within the field of network theory. Specifically, he believed that the modern world was shrinking due to the ever-increasing connectedness of human beings. In part due to technological advances in communications and travel (as it was in 1929), friendship networks would grow larger and span even greater distances. Karinthy posed that despite great physical distances between the globe's individuals, the increased density of human networks made the actual social distance far smaller.

As a result of this hypothesis, Karinthy's characters believed that any two individuals could be connected through at most five acquaintances. In his story, the characters create a game out of this notion. He writes: "A fascinating game grew out of this discussion. One of us suggested performing the following experiment to prove that the population of the Earth is closer together now than they have ever been before. We should select any person from the 1.5 billion inhabitants of the Earth—anyone, anywhere at all. He bet us that, using no more than five individuals, one of whom is a personal acquaintance, he could contact the selected individual using nothing except the network of personal acquaintances." Karinthy, Frigyes. Chain-Links (translated from Hungarian and annotated by Adam Makkai and Enikö Jankó). This idea both directly and indirectly influenced a great deal of early thought on social networks. Thus, Karinthy is often regarded as the originator of the notion of the "Six Degrees of Separation" theory.

Another key thinker in the field was Stanley Milgram, an American researcher in experimental social psychology at Harvard University. Beginning in 1967, he publicized a set of experiments to investigate the so-called "small world problem." This problem was rooted in many of the same observations made decades earlier by Karinthy. That is, Milgram and other researchers of the era were fascinated by the interconnectedness and "social capital" of human networks. The similarities between the two authors are remarkable. While Karinthy spoke in abstract and fictional terms, Milgram's experiments provided evidence supporting the claim of a "small world."

By the 1960's Milgram was able to perform a study whose results showed that people in the United States seemed to be connected by approximately six friendship links, on average. Because these studies were widely publicized, Milgram is also, like Karinthy, often attributed as the origin of the notion of "Six Degrees of Separation."

One school of thought on six degrees of separation is that a few well-connected individuals hold the keys to being able to connect anyone in the world. According to Malcolm Gladwell, who popularized the term in his 2000 book, *The Tipping Point: How Little Things Can Make a Big Difference* (Little Brown, ISBN 0-316-31696-2), "connectors" are people in a community who know large numbers of people and who are in the habit of making introductions. Connectors usually know people across an array of social, cultural, professional and economic circles, and make a habit of introducing people who work or live in different class structures. Although connectors are rare—only one in several thousand people might be thought of as a true connector—they are very important in society and in influencing trends.

Another school of thought is that social search is capable through intermediate to weak ties of different social networks without hubs or connectors and that these connections disproportionately rely on professional associations. Both approaches demonstrate that there is a strong likelihood that everyone in the world is connected.

The theory of Six Degrees of Separation is now widely known and has been thoroughly examined in academic work dating back to the 1960s. Most notably, Milgram found that most individuals are only six steps or six degrees away from connecting to any other individual by starting with their immediate circle of contacts and branching out. This phenomenon has also been known as the "Small World" theory. Several experiments have been performed to test this theory. Several social networking websites and systems exist that allow individuals to upload contacts and invite others to join their "social network" by opting into the website through signing up and/or adding their own contacts to the system. These websites and systems presume that many disparate social networks exists and are primarily focused on qualifying the links through having others verify that the relationship connection is valid.

Today, there are roughly 100 social networking sites on the Web. Only a handful, have communities of more than a few million. To date, no site has tried to complete the "small world" experiment online in an open forum. Further, these sites are "closed" systems where registered users may only interact with, and understand their relationship to, other registered users.

Given the foregoing, what are needed are methods and computer program products for facilitating the operation of online social networks that overcome the limitations described above with respect to the small world theory.

SUMMARY OF THE INVENTION

The present invention meets the above-identified needs by providing methods and computer program products for facilitating the operation of online social networks.

The method and computer program product, in an aspect, comprise receiving registration information from users in order to allow them to access the relational networking website, storing the contacts of each of the users in one or more databases associated with the site, and designating some of the users as "hubs." The method and computer program product, in such an aspect, further comprise assigning each hub a designated area or homepage within the website. Then, a user may perform a search for an individual of interest (i.e., a target node who need not be one of registered users of the site), where the site searches one or more of the associated databases in order to create a relationship path from the searching user to the individual of interest. The method and computer program product, in such an aspect, further comprise displaying the relationship path to the searching users (e.g., via a graphical user interface such as a Web browser), wherein the relationship path includes a link to at least one of hubs.

One advantage of the present invention is that it draws upon the six degree theories of Karinthy and Milgram, along with the Gladwell connector-based world view to provide a novel and efficient portal that enhances the way people view their relationships with people worldwide, while generating revenue via advertising.

Another advantage of the present invention is that it leverages the power and the breadth of the Internet to build a comprehensive relationship database, thus overcoming the limitations of Milgram-type studies.

Another advantage of the present invention is that it provides a novel way for end users to achieve potential access to the affluent, the famous, the interesting, or simply to those outside their immediate sphere—something that people of all backgrounds desire.

Yet another advantage of the present invention is that it breaks down the historical barriers (in the sense of not having visibility of their connectedness) that have prevented access between the classes, between the famous and the common, between the politicians and their constituents.

Yet another advantage of the present invention is that it takes advantage of the fact that, in business, people routinely seek to figure out if they have a relationship path to a potential customer, strategic partner, or intermediary. In fact, most jobs are secured through some personal connection no matter how weak that connection maybe. As a result, there are many commercial extensions of the methods and computer program products described herein.

Yet another advantage of the present invention is that, unlike other social networking websites, it utilizes one large social network that gets cordoned off into smaller subgroups. While people typically choose to separate into smaller sub-social networks, ultimately everyone is connected and the present invention aims to show exactly how this is the case. Thus, a relational networking site operated according to the methods and computer program products of the present invention allows people to discover the outer bounds of their social network.

Yet another advantage of the present invention is that it seeks, through revenue-sharing partnerships with other social networking websites, among others, to show each user has a "path" to everyone else in the world. Thus, users would be presented with their connections to persons outside of those typically member-only communities. Traditional social network services, however, only show connections among people who opt into their proprietary service. Now, someone using a first service (e.g., MySpace.com) may discover a connection to someone using a second social networking service (e.g., LinkedIn.com) via the site of the present invention.

Yet another advantage of the present invention is that it provides effective business development tools. For example, business executives can determine which of their relational paths is optimal to use in reaching out to a certain prospect. Sales professionals can end the challenging task of "cold calling." Sales executives or lead generators may no longer have to devise creative ways to get in front of purchasers. Readers of trade journals and industry materials can ascertain how they are connected to someone that they want to meet or collaborate with on a project. Users may be able to minimize "calling in too many favors" with one person with regard to making introductions by recognizing all their potential relationship paths to a target person.

Yet another advantage of the present invention is that it facilitates an "open" platform online social networking site which does not require a person to register in order to appear in a registered user's relationship path. This allows users to both discover and then leverage their own social graphs in a way that cannot be achieved via conventional "closed" or "walled garden" social networking websites.

Further features and advantages of the present invention, as well as the structure and operation of various aspects of the present invention, are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements. Additionally, the left most digit of a reference number identifies the drawing in which the reference number first appears.

DETAILED DESCRIPTION

Overview

Figure 1:
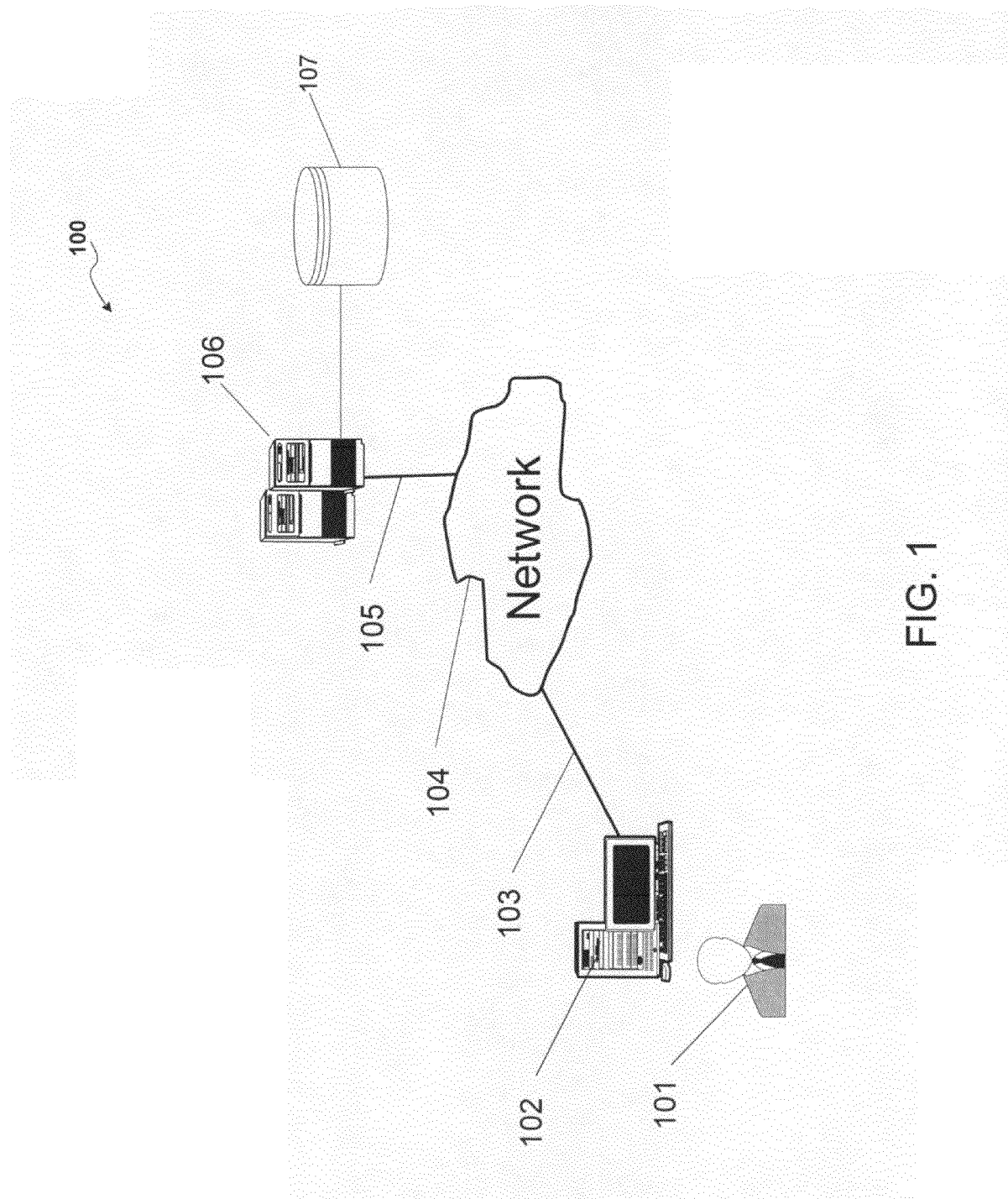
FIG. 1 is a system diagram of an exemplary environment in which the present invention, in an aspect, would be implemented.

The present invention is directed to methods and computer program products for facilitating the operation of online social networking sites.

In observing social interaction, people have a natural inclination when they meet someone new to try to determine whether they know someone in common. If, for example, someone meeting another for the first time says that they are from Lexington, Ky., the other person routinely searches their memory to figure out who they know or have met that is from Lexington, Ky. Then the parties typically engage in a discussion that begins to seek who they may know in common. This is a very common behavior that almost everyone does in most settings as a conversation piece. This process of trying to identify a "connection" is not based upon that connection agreeing that such a connection exists nor is it based upon that person consenting to the identification of the relationship path being discovered. There is meaning and significance to people simply being able to identify that they know someone in common and it often does not matter to them how close either one of them is to the person. Ultimately, everyone is connected to everyone else and it is simply a question of figuring out how. Aspects of the invention replicate this interaction using various process flows and survey techniques. The use of graphical user interfaces and net and subnet images allow users to find out who they know and see a population of people to which they are connected.

Aspect of the present invention relate to an online social networking website that maps relationships among all individuals using certain "hubs" or "connectors" to populate data in the system through adding and inducing the inclusion of information on individual connections worldwide.

In one aspect, the invention relates to methods for implementing an Internet-based relational network using a central portal wherein members of the network can search for individuals of interest and receive an image of a subnet that displays their relationship to the individual of interest and their degrees of separation therefrom. Certain members are classified as "hubs" and certain members in communication with a given hub are classified as "gatekeepers" to broker communications between users and a hub. The relational network is adapted to transmit advertisements and news feeds to users in response to their interactions with a hub member of the network.

Another aspect of the invention includes an online area (i.e., a website or portion thereof) where computer systems enable users to see their relationship path to any other person irrespective of the target person's registration into the network. The aspect is premised upon the idea that there is only one large social network where everyone is connected, but not all of those relationships are revealed or discovered. This network assumes that the most robust connections of individuals occur in smaller sub-social networks and the methods of the present invention find links of these sub-networks (or "subnets") through strong, intermediate, and weak links. The result is to show how everyone in the world is connected at a macro and micro level using various networks and subnets.

The present invention is now described in more detail herein in terms of the above exemplary contexts. This is for convenience only and is not intended to limit the application of the present invention. In fact, after reading the following description, it will be apparent to those skilled in the relevant art(s) how to implement the following invention in alternative aspects.

The terms "individual," "user," "voter," "donor," "end user," "member," "person," and/or the plural form of these terms are used interchangeably throughout herein to refer to those person(s) or entity(ies) seeking to discover their relationship path to one or more target persons (i.e., persons of interest), and thus would benefit from the methods and computer program products of the present invention disclosed herein.

The Environment

Referring to FIG. 1, a (simplified) system diagram 100 of various hardware components and other features in which the present invention, in an aspect, would be implemented is shown. As shown in FIG. 1, in an aspect of the present invention, data and other information for use in system 100 are, for example, input by a user (e.g., an individual, an organization, a corporation, a political campaign, etc.) 101 via a terminal 102, such as a personal computer (PC), minicomputer, laptop, palmtop, mainframe computer, microcomputer, telephone device, mobile device, personal digital assistant (PDA), or other device having a processor and input, display and communications capabilities. Terminal 102 is coupled to a server 106, such as a PC, minicomputer, mainframe computer, microcomputer, server computer, or other device having a processor and one or more associated repositories 107 for data or connection to one or more repositories for maintaining data, via a network 104, such as the global, public Internet, via (wired and/or wireless) communications couplings 103 and 105.

As will be appreciated by those skilled in the relevant art(s) after reading the description herein, in such an aspect, a service provider (i.e., an entity providing the infrastructure for one or more online "social networking" or "relational network" websites and advertising one or more corresponding URLs) may allow access, on a free registration, paid subscriber/membership, and/or pay-per-use basis, to the tools the present invention provide for enabling users to see their relationship path to any other person irrespective of the target person's registration status via one or more World-Wide Web (WWW) sites on the Internet 104. Thus, system 100 is scaleable such that multiple participants may utilize it to socially network and generally interact with other users of system 100.

As will also be appreciated by those skilled in the relevant art(s), in an aspect, various screens (e.g., login, admin, registration, contact upload, contact edit, account information, billing, resources, search, logout, etc.) would be generated by server 106 (using information stored in database(s) 107) in response to input from users 101 over the Internet 104. That is, in such an aspect, server 106 is a typical Web server (or collection of Web servers) running one or more server applications at a Web site which send out Web pages in response to Hypertext Transfer Protocol (HTTP) or Hypertext Transfer Protocol Secured (HTTPS) requests from remote browsers being used by users 101. Thus, server 106 is able to provide a graphical user interface (GUI) to users 101 of system 100 in the form of Web pages. These Web pages are sent to the user's PC, laptop, mobile device, PDA or like terminal device 102, and result in the GUI screens being displayed.

As will also be appreciated by those skilled in the relevant art(s) after reading the description herein, alternate aspects of the present invention may include providing the tool for enabling users to see their relationship path to any other person irrespective of the target person's registration status as an enterprise system wherein all the components of system 100 are connected and communicate via an intra-corporate wide area network (WAN) or local area network (LAN), rather than as a Web service (i.e., an application service provider (ASP) model) as shown in FIG. 1.

Building Maps of Relationship Paths

In an aspect of the present invention, a service provider (i.e., an entity providing one or more online social networking websites) allow users to register at a website thus enabling them to see their relationship paths to other persons. As will be appreciated by those skilled in the relevant art(s), users 101 using device 102 would access a registration page to create and register an account within system 100 for exploring and maintaining relationship paths and maps. Such registration process would present user 101 with the site's "Terms & Conditions" and "Privacy Policy" as is well known in the relevant art(s). Upon activating their account (e.g., by entering basic contact and biographical information, and then confirming their email address and/or billing information), the now registered user 101 is able to enter their contacts. The greater number of contacts user 101 enters, the more widespread and far-reaching their relationship paths will be. In one aspect, the user may manually input their contacts, upload a batch of contact information from a (CSV or text) file, or import a batch of contacts directly from an email program (e.g., Microsoft Outlook, Mozilla Thunderbird, etc.). As will be appreciated by those skilled in the relevant art(s), a "contact" refers to a file or record within a database containing fields corresponding to address-book related information (i.e., first name; middle initial; last name; home address; work address; business, mobile, home and fax numbers; birth date; anniversary date; employer; title; etc.) about an individual with whom the user has an existing relationship.

In one aspect of the present invention, user 101 may classify their relationship with each inputted/uploaded/imported contact (e.g., business partner, relative, friend, co-worker, associate, classmate, etc.). The user may then choose to send an email to each of his contacts to notify the contacts of their new status or even to introduce the contact to the relational network site in hopes of recruiting the contacts to populate their respective contacts into the relational network site. As will be appreciated by those skilled in the relevant art(s), the users account information and contacts are stored in repository 107 associated with processor 106 of the relational network site. This allows displays (i.e., GUI screens) to be presented to user 101 in order to view, edit, add, delete and otherwise manage their contacts upon subsequent returns to the site.

Figure 2:
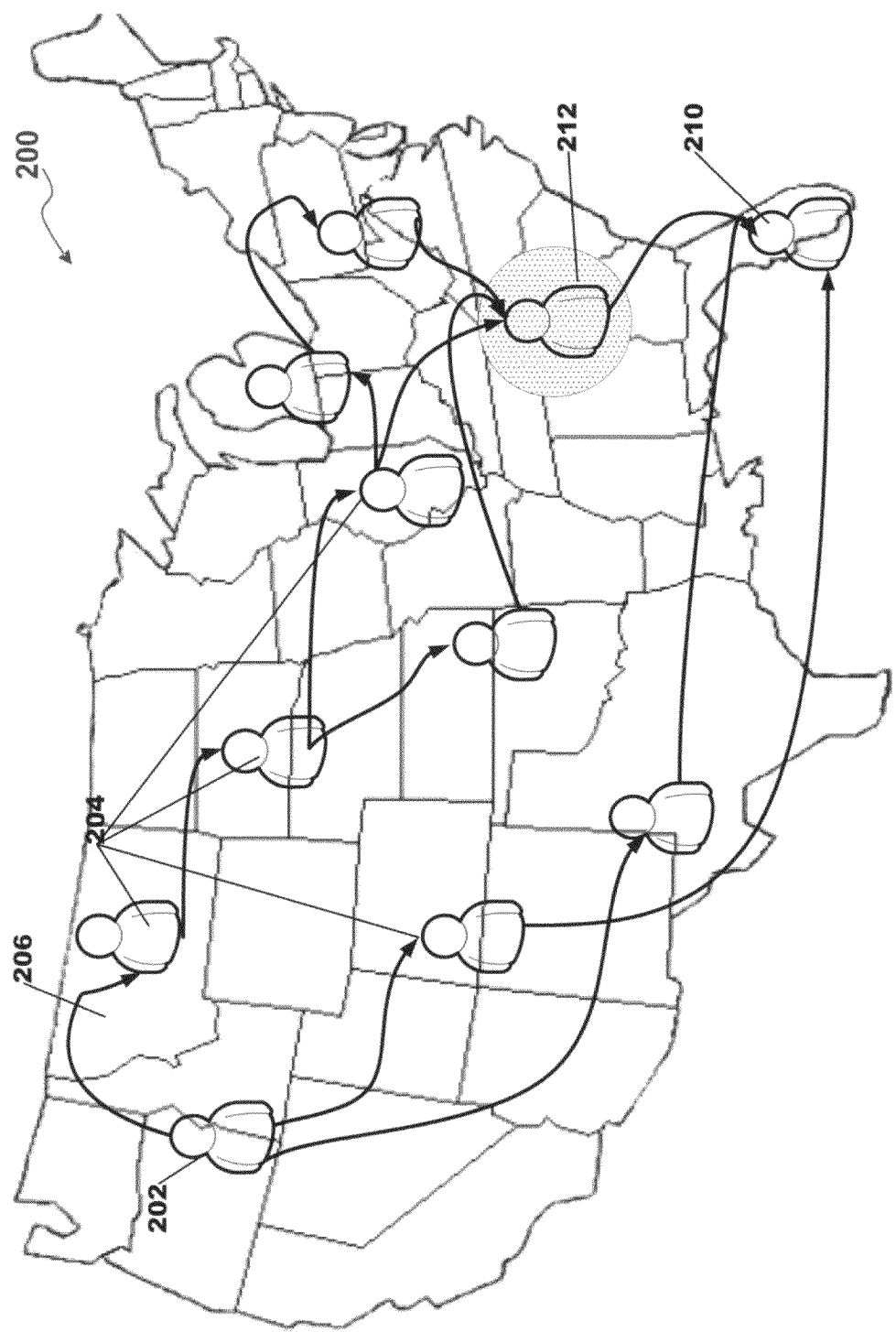
FIG. 2 is a block diagram of a relationship path map in accordance with an aspect of the present invention.

Referring to FIG. 2, a relationship path map 200 is shown in accordance with one aspect of the invention. In such an aspect, a first user—represented by a searching node 202 may enter a search to determine how he or she can be linked through various degrees of relationships to another person, represented as a target node 210. For illustrative purposes the relationship map 200 is shown overlaying a map of the United States. One skilled in the relevant art(s) would recognize that the scope and spirit of the invention should not be limited to any geographical boundary for any given relationship path. In the exemplary map 200, searching node 202, representative of the searching registered user, may have a relationship with a second user 204 and is thereby linked to a second node on the map by a relationship path segment (or "link") 206. The second node 204 may be linked to another user 204 and so forth. The relationship path continues through the nodes along established relationship path links until target node 210 is reached.

In one aspect of the present invention, a searched relationship path travels through a hub 212 in reaching target node 210. As explained in more detail below, a hub represents a user with numerous contacts and/or popular appeal. (Or, hub 212 may also be thought of as a "connector" according to Gladwell's *Tipping Point*.) As the hub 212 is linked, or has relationship paths to several other users or nodes, establishing a path is facilitated by traveling through those hubs en route to target node 210. As will be appreciated by those skilled in the relevant art(s) after reading the description herein, in many instances there will be multiple relationship paths (thus forming a relationship path map) linking two nodes. That is, by traveling through different nodes 204, there may different relationship paths to the same target node 210.

In certain aspects, the target node or any other persons along the relationship paths need not be a registered user of the relational networking site of the present invention. In such aspects, the site will not publish the personal contact information (e.g., email address, physical address, telephone number, etc.) of the contacts of registered users 101 or those unregistered users appearing in anyone's relationship path map. The network of registered users accessing aspects of the present invention will only see the relationship path(s) to another person. In such aspects, the only information displayed for each person along a relationship path is their name, city and profession. Consequently, a search string received by the site from a user would comprise a first name and/or a last name and/or a city of an individual of interest (i.e., a target node 210). Thus, the searching user must rely on reaching out to the first-level person in their path to determine how to navigate (i.e., reach and communicate) to the next level of their relationship path.

In certain aspects of the present invention, one or more opt-in, premium user areas are provided such that supplemental information is included in relationship path maps. For example, one aspect may incorporate information from a third-party provider such as ZoomInfo.com about each person along the relationship path (e.g., employer, title, years of service, etc.). Aspects of the invention can also place search-result type information (i.e., information found upon searching a person on an online search engine such as Microsoft Live Search, Google, or Yahoo!) so that there is more information presented about each person along any given relationship path within a map.

In one aspect of the present invention, the strength of a relationship can be characterized (e.g., by assigning one of a pre-determined numerical weight range of values, such as 1-10, or list of adjective labels such as "weak," "medium," "strong," etc.) and monitored via the relational network site. For example, a first user 101 may have a telephone interaction with a second user 101 and wish to add them to their contacts (i.e., add them to their network and thus to their relationship paths to other persons). Upon linking to the second user and categorizing the nature of the interaction (e.g., telephone call), the first user's relationship path link to the second user may be classified as "weak." If the user subsequently meets the other user in a face-to-face meeting, the interaction category may be changed to indicate a stronger relationship path link. The strength of connections along a path may vary greatly, however there is value in knowing that a path even exists. The user may update the interaction categories through the user's mobile device, PC, PDA or other device 10 allowing connection to processor(s) 106 and thus database(s) 107.

Hubs and Gatekeepers

With respect to hub 212 (i.e., a "connector" or a person who knows a lot of other people and who a lot of other people want to know) shown in FIG. 2, examples may include, without limitation, movie stars, prominent business leaders, entertainers, athletes, politicians and local community leaders others know and/or want to know better. In one aspect of the present invention, the service provider running the site will recruit a limited number of hubs 212 (e.g., between 5-10) per city or metropolitan statistical area (MSA) in order to attract other individuals to register as users on the site. In another aspect, an individual may voluntarily register as a user and be designated a hub 212 or connector based on surpassing a predetermined threshold of contacts inputted/uploaded/imported.

In one aspect of the present invention, all hubs 212 may receive an advertising revenue share associated with the content of their pages. The hub may share in all advertising on pages leading to them and in some aspects be allowed to control some of the advertising inventory. In another aspect, hubs 212 may be compensated using a revenue generating model and/or fee sharing arrangement.

In an aspect of the present invention, advertising inventory is valuable because only a limited number of significant hubs (e.g., such as a famous athlete with well-known advertising arrangements or contacts) will have the ability for every person seeking their path to them to complete a survey about purchasing preferences (e.g., travel, clothing, etc.) so that database(s) 107 store valuable information for the site to sell targeted advertising. Many of such potential hubs are already being searched online on the Internet daily. Presently, hubs have no real way to monitor who is searching them, how to monetize those searches, or how to get a message to those searching. Many of the hubs are already targets of attempts by people to get an audience with them. Aspects of the invention will allow hubs to input their contacts and essentially build a buffer around them to the extent that they want to manage the gatekeepers of potential introductions.

Aspects of the invention may only show people their paths to others and does not give out contact information (i.e., no telephone numbers or emails are presented in the path). Each person trying to connect with someone in their "path" will have to start with their first-level contacts and proceed from there. In one aspect, in a non-premium section of the networking site, work may be done offline and will be vetted by each person along a hub's relationship path.

In one aspect, persons who want to use the networking site to reach a hub will only see a path where there is already a direct connection to the hub. The person seeking the contact will still need to convince each person along the path of their rationale for meeting or contacting the hub. Such an implementation may reduce the number of times hubs are bombarded with inquiries. This follows because a hub can use automated or living gatekeepers as the only entities through which they can be contacted.

Aspects of the invention may also include tools to help hubs better manage their extensive database of contacts. Aspects of the invention may include special services for hubs, such as sending out birthday cards on behalf of the hubs or sending the hubs reminders of important dates (e.g., birthdays of friends, anniversaries, etc.).

Revenue Generation

In an alternate aspect of the present invention, system 100 supports "viral" marketing campaigns by challenging people to help in an enjoyable experience and an effort to show how everyone in the world is interconnected. Such an aspect provides a valuable business tool and powerful advertising platform by including the ability to conduct relationship-based advertising whereby advertisers are able to target their advertisements to people who have a direct connection to the endorser of product or with the advertiser.

In an alternate aspect of the present invention, system 100 supports a viral marketing effort to encourage people to join a significant undertaking on the Internet—showing how everyone is connected. In such an aspect, users will sign up out of curiosity to determine how they are connected to certain celebrities, prominent business leaders or politicians. For example, a user may find it interesting to see their relationship path to a famous person such as a politician, professional athlete, musician or actor. Once a user knows the relationship path, they would be presented the options of doing nothing with the information or traveling down one of the presented relationship paths to gain a connection to such famous person or celebrity. In various aspects, sponsored advertising and purchase opportunities may be integrated. Further, premium subscription services may be offered to facilitate establishing meetings and other interaction opportunities between users.

In alternate aspects of the present invention, movie studios or other entertainment providers may target audiences in the most personal way by having stars in their films create an account or identity on the relational networking site. This would help movie studios directly advertise their productions to people searching their paths to the stars of such productions. Music label companies, for example, could encourage artists to populate the site with their contacts such that they can market new album releases whenever a user searches the site to discover their relationship path to one of the label's artists. Network television could promote their shows in the same fashion by having actors/actresses populate the site with their contacts. In such aspects, advertisements may be dynamically served whenever someone searches for a specific recording artist or actor/actress. Additionally, professional sports leagues may promote products, games, and special events in the same fashion by encouraging their athletes to populate the site with their contacts.

In alternate aspects of the present invention, links to family lineage and genealogy websites to explore familial connections may be included. Through partnerships with websites such as Classmates.com, MySpace.com and LinkedIn.com, among others, such sites would allow their members to see connections outside of those communities. In such aspects, contacts of other service providers and social networks may be aggregated and categorized through the relational network site of the present invention. Accordingly, a user 101 may provide the user's log-in information from one or more outside service providers. System 100 would then poll the contact data from such outside service providers and generate a comprehensive relationship path map that is not limited to the registered users of the relational network site of the present invention. For example, a user may provide the log-in/password information from their Internet mail provider accounts (e.g., Yahoo!, Gmail, Hotmail, etc.). System 100 can then poll the user's Internet email address books for contacts and generate a relationship path map incorporating these contacts—regardless if the contacts from the Internet email address books are registered users of the relational network site of the present invention.

In one aspect, advertising and premium services are sources of revenue for the service provider allowing access to the relational networking site of the present invention. The advertising revenue model will have information relative to each registered user to specifically target their advertisements. Through the hubs, the networking site will be able to gather information on users. For example, if a user wants to see her path to a famous athlete, then she must provide some information about herself because the hub requires such information of anyone searching for paths to the famous athlete. Moreover, hubs will be able to advertise their own products (e.g., a famous athlete could promote his signature product, or any other product, on pages displaying paths to him), favorite causes, or ideas via a designated area (e.g., a "homepage" on the site).

Aspects of the invention may include add-on services such as helping members to maintain contacts with their database of relationships. It is difficult for someone with thousands of contacts to correspond with each of those contacts on a regular basis. The networking site may include simple and neutral messages that can be sent to other persons along any path. Aspects of the invention can deliver birthday cards, anniversary cards, etc. for registered users.

In sum, a lot of information may be gathered and (securely) stored in database(s) 107 concerning users 101, which increases the rate advertisers are willing to pay to advertise on the site of the present invention. For example, one aspect of the present invention includes a model which places click-through advertisements on certain (home) pages associated with certain hubs which users 101 may respond to (e.g., by clicking a hyperlink on the homepage or specified area within the site associated with a specific hub 212).

Alternate Aspects

In an alternate aspect of the present invention, system 100 supports political activities such that a politician may seek relationship paths to potential donors and voters. For example, a politician may register with the social network site, upload a list of potential voters or donors into his contact database, and then allow the site to establish relationship paths to each potential voter or donor. The system, in such an aspect, may generate a mailing (e.g., paper mail, email, text message, etc.) in which the politician may be introduced or shown the ways the politician is connected to each user/voter. Further, politicians could send letters to potential voters that open with: "You and I share a mutual contact . . . ." This feature can be extended to any type of fundraising campaign. With respect to the political landscape, this feature would draw the potential voters' attention and perhaps make them read the political material prior to, or rather than simply, throwing it away.

With regard to politicians, certain aspects of the present invention could also serve as the backbone for any campaign's own robust database of donors, supporters, etc. Campaigns could use the relational networking site's infrastructure to build out more robust information about the interrelationship of potential voters and supporters. Aspects of the invention may allow voters to collaborate on fundraisers, get-out-to-vote campaigns, and voter registration drives. Aspects of the invention will enable politicians to truly "connect" with voters and donors in a way that would be attention grabbing.

In another aspect of the present invention, system 100 supports organizations in determining the respective relationship paths for each of their members to existing clients, client prospects, existing members, potential new members, etc. For example, an organization may upload an external target list of potential contacts to the relational network site. The organization may also include contact information for its employees, directors, advisors, etc. The system, in such an aspect, may generate a relationship path from the organization and each of its internal contacts (e.g., employees, directors, agents, advisors, etc.), to the targeted contacts. In analyzing the resulting map of relationship paths thus created, the organization may be able to establish communication or other dialog with such targets based upon the relationship paths from its internal contacts.

In yet another alternate aspect of the present invention, system 100 supports allowing users to determine how they are connected to an interesting person they read about in a newspaper or magazine article. For example, any user attending a conference or networking event could access the social networking site from their handheld PDA to determine how they are connected to a person they just met (e.g., a presenter at the conference or an exhibitor). Thus, anyone attending a networking event may have an immediate ice breaker to discuss with anyone that they meet at such event (e.g., "I see that you know my law school classmate."). Such an aspect may also supplement the numerous online dating websites. Prior to going on a first date, for example, an end user could search the relational networking site to determine their relationship path to their date. This information could lead to a more fluid conversation based upon on the newly-found personal connectedness.

In an alternate aspect of the present invention, a referral area is provided within the relational networking site where users can input the title of a service needed (e.g., "Plumber"). In response, the site would display a relational path to a plumber. The plumber may be able to perform the work or provide a referral to another more qualified plumber. This acts as a quasi endorsement of the plumber based upon the association.

In an alternate aspect of the present invention, a meeting area is provided within the relational networking site where users can post meeting requests. That is, if a user has opted to receive meeting notices for a certain type of meeting (e.g., "notices of all Private Equity meeting requests in Dubai related to gaming"), users connected along the relationship path of the meeting poster would receive (via email, text, message box on the site, etc.) notice of the post. Alternatively, a user does not have to opt into receiving meeting notices, but can simply go on the meeting area to see what has been posted. If something grabs their interest, they can search the name of the meeting requester for a relational path or they can simply reply to the meeting request via the site.

In an alternate aspect of the present invention, a humanitarian area is provided within the relational networking site where users can facilitate collaboration among connected users to solve social ills. For example, users may post Hurricane Katrina-related relief efforts or "clean water supply." Users connected along the relationship path of the poster would receive (via email, text message, message box on the site, etc.) notice of the post if they opted to receive such notices. Alternatively, a user does not have to opt into receiving such notices, but can simply go on the humanitarian area to see what has been posted. If something grabs their interest, they can search the name of the poster for a relational path or they can simply reply to the posting via the site. This allows people to see relationship paths to people who care about the same social issues that they care about, and potentially collaborate with them.

Example Implementation

The present invention (i.e., system 100, process 200, and the systems and methods for facilitating the redemption of affinity reward points as political contributions described above of the present invention, or any part(s) or function(s) thereof) may be implemented using hardware, software or a combination thereof and may be implemented in one or more computer systems or other processing systems. However, the manipulations performed by the present invention were often referred to in terms, such as "selecting," "determining," "categorizing," and "searching" which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices.

Figure 3:
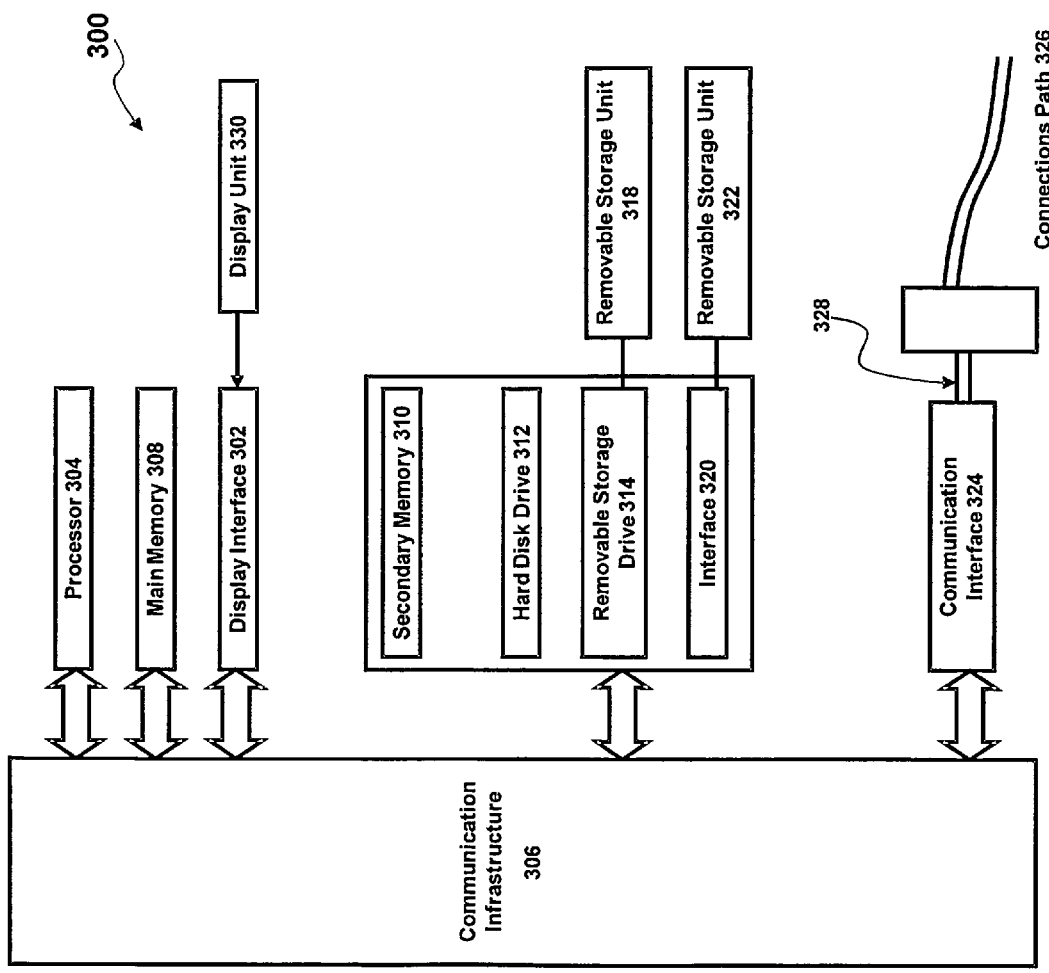
FIG. 3 is a block diagram of an exemplary computer system useful for implementing the present invention.

In fact, in one aspect, the invention is directed toward one or more computer systems capable of carrying out the functionality described herein. An example of a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this exemplary computer system. After reading this description, it will become apparent to a person skilled in the relevant art(s) how to implement the invention using other computer systems and/or architectures.

Computer system 300 can include a display interface 302 that forwards graphics, text, and other data from the communication infrastructure 306 (or from a frame buffer not shown) for display on the display unit 330.

Computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. The removable storage drive 314 reads from and/or writes to a removable storage unit 318 in a well known manner. Removable storage unit 318 represents a floppy disk, magnetic tape, optical disk, etc. which is read by and written to by removable storage drive 314. As will be appreciated, the removable storage unit 318 includes a computer usable storage medium having stored therein computer software and/or data.

In alternative aspects, secondary memory 310 may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328 which may be electronic, electromagnetic, optical or other signals capable of being received by communications interface 324. These signals 328 are provided to communications interface 324 via a communications path (e.g., channel) 326. This channel 326 carries signals 328 and may be implemented using wire or cable, fiber optics, a telephone line, a cellular link, an radio frequency (RF) link and other communications channels.

In this document, the terms "computer program medium" and "computer usable medium" are used to generally refer to media such as removable storage drive 314, a hard disk installed in hard disk drive 312, and signals 328. These computer program products provide software to computer system 300. The invention is directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features of the present invention, as discussed herein. In particular, the computer programs, when executed, enable the processor 304 to perform the features of the present invention. Accordingly, such computer programs represent controllers of the computer system 300.

In an aspect where the invention is implemented using software, the software may be stored in a computer program product and loaded into computer system 300 using removable storage drive 314, hard drive 312 or communications interface 324. The control logic (software), when executed by the processor 304, causes the processor 304 to perform the functions of the invention as described herein.

In another aspect, the invention is implemented primarily in hardware using, for example, hardware components such as application specific integrated circuits (ASICs). Implementation of the hardware state machine so as to perform the functions described herein will be apparent to persons skilled in the relevant art(s).

In yet another aspect, the invention is implemented using a combination of both hardware and software.

CONCLUSION

Variations, modifications, and other implementations of what is described herein will occur to those of ordinary skill in the relevant art(s) without departing from the spirit and scope of the invention as claimed. Accordingly, the invention is to be defined not by the preceding illustrative description but instead by the spirit and scope of the following claims.

In addition, it should be understood that the figures in the attachments, which highlight the structure, methodology, functionality and advantages of the present invention, are presented for example purposes only. The present invention is sufficiently flexible and configurable, such that it may be implemented in ways other than that shown in the accompanying figures.

Further, the purpose of the foregoing Abstract is to enable the U.S. Patent and Trademark Office and the public generally, and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present invention in any way.

What is claimed is:

1. A method of operating an Internet-based social networking website for a first social network, comprising:
    (a) receiving registration information from a plurality of users in order to allow each of said plurality of users to access information stored in a database associated with the website;
    (b) storing in said database, for each of said plurality of users, a plurality of contacts;
    (c) designating a plurality of hubs from among said plurality of users, wherein each of said plurality of hubs is assigned a designated page within the website, and wherein said plurality of hubs is a subset of said plurality of users, each hub having a plurality of relationship paths to other users of the first social network and to users of a second, different social network;
    (d) receiving, from one of said plurality of users, a search string indicative of an individual of interest, wherein said search string comprises at least one of: a first name; a last name; and a city;
    (e) searching at least said database in order to create a relationship path from said one of said plurality of users via said hub to said individual of interest of one of said first social network and said second, different social network; and
    (f) displaying said relationship path to said one of said plurality of users;
    wherein said relationship path includes a link to at least one of said plurality of hubs; and
    wherein said individual of interest need not be one of said plurality of users of said first social network.

2. The method of claim 1, wherein step (b) comprises:
    storing, in said database, an indication of degree of strength of the relationship between each of said plurality of users and their respective said plurality of contacts.

3. The method of claim 2, wherein each link of said relationship path is labeled with an indication of degree of relationship strength.

4. The method of claim 3, wherein said indication of degree of relationship strength is a numerical weight.

5. The method of claim 3, wherein said indication of degree of relationship strength is one of the following labels: weak; medium; and strong.

6. The method of claim 1, wherein each link of said relationship path is labeled with an indication of relationship category.

7. The method of claim 6, wherein said indication of relationship category is one of the following labels: business partner; relative; friend; co-worker; associate; and classmate.

8. The method of claim 1, wherein said registration information received from each of said plurality of users in step (a) includes at least one of: name; email address; and city of residence; and profession.

9. The method of claim 8, wherein each link of said relationship path displayed to said one of said plurality of users is labeled with at least the name, city of residence and profession of the individuals comprising the link.

10. The method of claim 8, wherein said relationship path displayed to said one of said plurality of users includes a hyperlink to the designated page corresponding to said at least one of said plurality of hubs.

11. The method of claim 10, wherein each designated page associated with each of said plurality of hubs contains at least one advertisement related to the registration information received from the corresponding one of said plurality of hubs.

12. The method of claim 11, wherein said at least one of said plurality of hubs is compensated when said one of said plurality of users visits the designated page corresponding to said at least one of said plurality of hubs.

13. The method of claim 12, wherein said at least one of said plurality of hubs receives additional compensation when said one of said plurality of users responds to said at least one advertisement on the designated page corresponding to said at least one of said plurality of hubs.

14. The method of claim 1, wherein each of said plurality of hubs is one of: a movie star; a prominent business leader; a celebrity; an entertainer; a professional athlete; an elected official; and a local community leader.

15. The method of claim 1, wherein step (c) comprises:
determining, for each of said plurality of users, whether their corresponding plurality of contacts stored in said database exceeds a predetermined threshold number.

16. The method of claim 1, wherein step (e) comprises:
utilizing an Internet search engine in order to create said relationship path from said one of said plurality of users to said individual of interest.

17. The method of claim 1, wherein step (e) comprises:
searching a third-party social networking site in order to create said relationship path from said one of said plurality of users to said individual of interest.

18. The method of claim 1, wherein step (f) is accomplished via a graphical user interface.

19. The method of claim 1, wherein the individuals that comprise said relationship path are not all members of the set consisting of said plurality of users.

20. A method of operating an Internet-based social networking website for a first social network, comprising:
(a) receiving registration information from a plurality of users in order to allow each of said plurality of users to access information stored in a database associated with the website;
(b) storing in said database, for each of said plurality of users, a plurality of contacts;
(c) receiving registration information from a plurality of hubs, wherein each of said plurality of hubs is assigned a designated page within the website, each hub having a plurality of relationship paths to other users of the first social network and to users of a second, different social network;
(d) receiving, from one of said plurality of users, a search string indicative of one of said plurality of hubs;
(e) searching at least said database in order to create a relationship path from said one of said plurality of users to said one of said plurality of hubs and, via said hub, to an individual of interest in one of said first social network and said second, different social network; and
(f) displaying said relationship path to said one of said plurality of users;
wherein the individuals shown in said relationship path need not be one of said plurality of users of said first social network.

21. The method of claim 20, wherein each of said plurality of hubs is one of: a movie star; a prominent business leader; a celebrity; an entertainer; a professional athlete; an elected official; and a local community leader.

22. The method of claim 21, wherein the designated page associated with said one of said plurality of hubs contains at least one advertisement related to the registration information received from said one of said plurality of hubs.

23. The method of claim 22, wherein said one of said plurality of hubs is compensated when said one of said plurality of users visits the designated page corresponding to said one of said plurality of hubs.

24. The method of claim 23, wherein said one of said plurality of hubs receives additional compensation when said one of said plurality of users responds to said at least one advertisement on the designated page corresponding to said one of said plurality of hubs.

25. A computer program product comprising a non-transitory computer usable medium encoded in a computer having control logic stored therein for causing the computer to provide an Internet-based social networking website for a first social network, said control logic comprising:
first computer readable program code means for causing the computer to receive registration information from a plurality of users in order to allow each of said plurality of users to access information stored in a database associated with the website;
second computer readable program code means for causing the computer to store in said database, for each of said plurality of users, a plurality of contacts;
third computer readable program code means for causing the computer to designate a plurality of hubs from among said plurality of users, wherein each of said plurality of hubs is assigned a designated page within the website, each hub having a plurality of relationship paths to other users of the first social network and to users of a second, different social network;
fourth computer readable program code means for causing the computer to receive, from one of said plurality of users, a search string indicative of an individual of interest, wherein said search string comprises at least one of: a first name; a last name; and a city;
fifth computer readable program code means for causing the computer to search at least said database in order to create a relationship path from said one of said plurality of users via said hub to said individual of interest of one of said first social network and said second, different social network; and
sixth computer readable program code means for causing the computer to display said relationship path to said one of said plurality of users;
wherein said relationship path includes a link to at least one of said plurality of hubs; and
wherein said individual of interest need not be one of said plurality of users of said first social network.

26. The computer program product of claim 25, wherein said second computer readable program code means comprises:
seventh computer readable program code means for causing the computer to store, in said database, an indication of degree of strength of the relationship between each of said plurality of users and their respective said plurality of contacts.

27. The computer program product of claim 26, wherein each designated page associated with each of said plurality of hubs contains at least one advertisement related to the registration information received from the corresponding one of said plurality of hubs.

28. The computer program product of claim 25, wherein each of said plurality of hubs is one of: a movie star; a prominent business leader; a celebrity; an entertainer; a professional athlete; an elected official; and a local community leader.

29. The computer program product of claim 25, wherein said fifth computer readable program code means comprises:
    seventh computer readable program code means for causing the computer to utilize an Internet search engine in order to create said relationship path from said one of said plurality of users to said individual of interest.

30. The computer program product of claim 25, wherein said fifth computer readable program code means comprises:
    seventh computer readable program code means for causing the computer to search a third-party social networking site in order to create said relationship path from said one of said plurality of users to said individual of interest.

31. A computer program product comprising a non-transitory computer usable medium encoded in a computer having control logic stored therein for causing the computer to provide an Internet-based social networking website for a first social network, said control logic comprising:
    first computer readable program code means for causing the computer to receive registration information from a plurality of users in order to allow each of said plurality of users to access information stored in a database associated with the website;
    second computer readable program code means for causing the computer to store in said database, for each of said plurality of users, a plurality of contacts;
    third computer readable program code means for causing the computer to receive registration information from a plurality of hubs, wherein each of said plurality of hubs is assigned a designated page within the website, each hub having a plurality of relationship paths to other users of the first social network and to users of a second, different social network;
    fourth computer readable program code means for causing the computer to receive, from one of said plurality of users, a search string indicative of one of said plurality of hubs;
    fifth computer readable program code means for causing the computer to search at least said database in order to create a relationship path from said one of said plurality of users to said one of said plurality of hubs and, via said hub, to an individual of interest in one of said first social network and said second, different social network; and
    sixth computer readable program code means for causing the computer to display said relationship path to said one of said plurality of users;
    wherein the individuals shown in said relationship path need not be one of said plurality of users of said first social network.

32. The computer program product of claim 31, wherein each of said plurality of hubs is one of: a movie star; a prominent business leader; a celebrity; an entertainer; a professional athlete; an elected official; and a local community leader.

33. The computer program product of claim 32, wherein the designated page associated with said one of said plurality of hubs contains at least one advertisement related to the registration information received from said one of said plurality of hubs.

34. The computer program product of claim 33, wherein said one of said plurality of hubs is compensated when said one of said plurality of users visits the designated page corresponding to said one of said plurality of hubs.

35. The computer program product of claim 34, wherein said one of said plurality of hubs receives additional compensation when said one of said plurality of users responds to said at least one advertisement on the designated page corresponding to said one of said plurality of hubs.

\* \* \* \* \*